Patented Oct. 24, 1922.

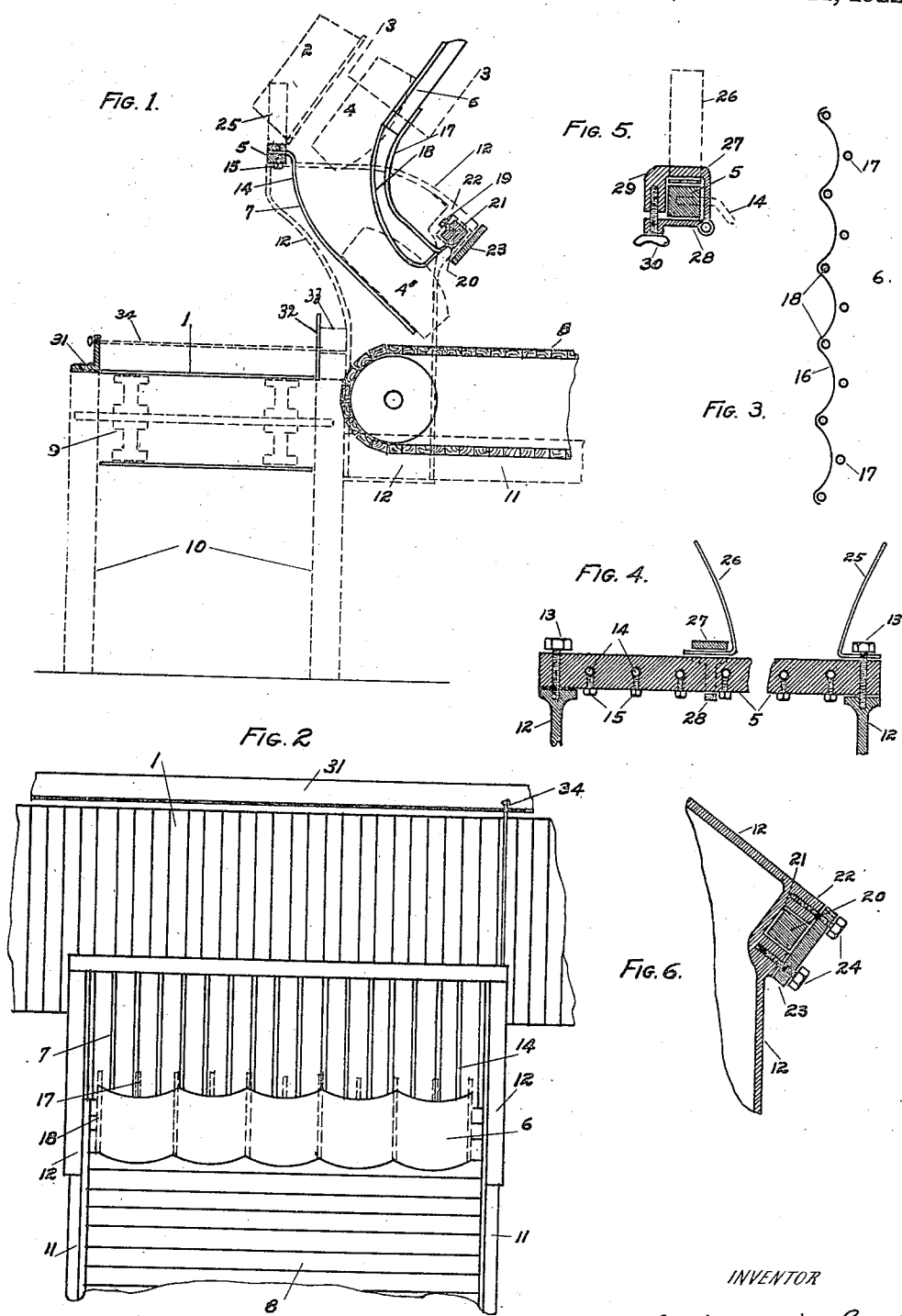

1,432,747

UNITED STATES PATENT OFFICE.

GUSTAV BERNHARD EGGERT, OF SAGINAW, MICHIGAN, ASSIGNOR TO BAKER-PERKINS MANUFACTURING CORPORATION, OF SAGINAW, MICHIGAN, A CORPORATION OF NEW YORK.

APPARATUS FOR AUTOMATICALLY RIGHTING LOAVES OF BREAD.

Application filed November 30, 1921. Serial No. 518,878.

*To all whom it may concern:*

Be it known that I, GUSTAV BERNHARD EGGERT, a citizen of the United States, residing at Saginaw, in the county of Saginaw and State of Michigan, have invented a new and useful Apparatus for Automatically Righting Loaves of Bread, of which the following is a specification.

Bread is generally baked in pans from which it must be removed as quickly as possible. When the loaves are tipped out on a table, tray, conveyer or the like, they naturally drop on their tops, which, as the latter are curved, causes them to tumble about anyhow. In order to give to the loaves a firm footing, they are righted, that is: they are put flat bottom downward and round top upwards, by hand, which operation, as the loaves are still very hot and awkward to handle, is disagreeable and gives cause for their being not infrequently soiled and even damaged.

My invention consists in an apparatus for automatically righting the loaves tipped from their pans, and has for its object to attain the sanitary advantage of the loaves remaining untouched by hand during this operation, to save the labour involved, and to prevent any possible contamination of or damage to the loaves.

To this end, my new apparatus is composed essentially of two inclined planes placed one above the other and pointing in opposite direction to each other, the distance in the horizontal between the lower end of the upper plane and the upper part of the lower plane being such that a loaf of the kind to be righted, when in an upright position, can easily pass through between them. The upper plane serves as baffle against which the loaves tipped out of their pans drop, and is hereinafter therefore also called the "baffle". The loaves touch the latter with their tops, slide down the same by their own gravity, hit then the upper part of the lower plane—hereinafter called the "chute"—with the edge of their bottom, and, thus turned over, pass down the same, duly righted. The baffle and the chute may be constructed of metal plate, boards of wood or any other suitable material, parallel rods or slats or any other structure the surface of which answers the requirements. In order to facilitate the passage from the baffle to the chute and the righting thereby of the loaves, I preferably have the upper part of the chute curved concavely towards the lower end of the baffle. It is obvious that for obtaining always best results, it is necessary to tip the loaves from the pans in the right way onto the right place of the baffle; to attain this end and to make at the same time the work as easy and convenient as possible for the operator, I arrange the baffle and chute opposite to him just above and alongside the platform for the pans to be emptied, which may consist of a table, a conveyer or the like, and place above the same parallel and opposite to the baffle and slightly above the upper end of the chute a stout bar of metal or wood, on which the pans are canted over to empty them onto the baffle, and against which they are struck, if it becomes necessary to loosen the loaves contained therein; this bar is hereinafter called the "canting bar". The latter, as well as the baffle and chute, are preferably carried at their ends by upright supports, one single support serving for all three at each side, the side walls of these two supports serving at the same time as side walls for the chute, thus preventing any loaves from leaving the same. It is frequently desired, that, while being righted, the loaves are at the same time arranged lengthwise and side by side; for this purpose, I provide in the baffle vertically to the canting bar channels or grooves corresponding in width to the cross section of the top of the loaves to be righted; I preferably also arrange guide rods forming a prolongation of the ridges situated between these channels or grooves and following the outline of the plane of the chute at such a distance from the same and from each other as to guide the upper parts of the loaves passing down the chute. In order to place the pans exactly opposite to these channels or grooves, guides are arranged on the canting bar. The whole baffle with its channels and grooves and the rods, guiding the loaves down the chute are so arranged and attached to their supports that they can easily and quickly be exchanged if loaves of a different size are to be righted; in this case also means are provided to regulate the position of the guides on the canting bar accordingly, which is preferably done by movably fixing one of the guides to the bar by a clamp.

For more fully and minutely explaining my invention, I describe in the following and show in the accompanying drawings an example of the construction of the novel apparatus as actually in use in large bread bakeries.

Fig. 1 is a vertical section, and Fig. 2 a top view of the apparatus. Fig. 3 represents a cross section of the baffle on the line 3—3. Fig. 4 is a vertical section in broken length of the canting bar showing the fastening to its supports and the guides for the pans to be emptied. Fig. 5 is a cross section through the canting bar and the clamp fixing the movable guide to the former. Fig. 6 is a cross section through the end of the bar carrying the baffle and guides, showing the means to exchange them.

Like numerals of reference indicate corresponding parts serving the same or similar purposes. The necessary supports and the moving parts of the conveyers are shown in dotted lines.

In the drawings, 1 indicates a steel slat conveyer removing the baked bread from the oven and serving as platform from which the attendant lifts the pans 2 containing the loaves 4, and cants them over into the position on the canting bar 5, as shown in dotted lines, striking, if necessary, the pans slightly against the same in order to loosen the loaves from their walls. The loaves 4 are thereby separated from the pans 2, drop onto the baffle 6, touching it with their top, slide down the same and hit with the lower edge of their bottom the bent chute 7 pointing in the opposite direction to the inclination of the baffle 6. Passing then, top now upwards, down the chute 7, they reach the position 4' on the conveyer 8 which carries them, thus duly righted, away.

The conveyer 1 is worked by the moving gear 9 and supported by the frame work 10, to which the beams 11 carrying the conveyer 8 are fixed at one end. The upright supports 12, on which the canting bar 5, the baffle 6 and the chute 7 are mounted, are securely bolted to the beams 11 and so constructed that they serve as side walls of the chute 7 whereby the loaves sliding down the latter are prevented from slipping over its side edges. The canting bar 5 is rigidly fastened to the top of the supports 12 by the screws 13 and carries the chute 7 which in this case is composed of a number of parallel round curved rods 14 arranged in their length vertically to 5 and forming a curved plane ending above the conveyer 8. The rods 14 are secured in corresponding holes provided in the canting bar 5 by means of the screws 15. The baffle 6 shown here consists mainly of the corrugated iron plate 16 the grooves of which correspond to the cross section of the top of the loaves to be righted and are situated vertically to the canting bar 5 so that the loaves dropping thereon arrange themselves side by side lengthwise as they are contained in the "nests" to which the bread pans are usually combined, fastened to each other at their sides. The plate 16 is carried at the bottom of its grooves by the rods 17 and at the ridges, in which the grooves meet, by the rods 18. The rods 17 and 18 are parallel to each other and curved downwards; the rods 18, following the curve of the chute 7, serve as side guides for the upper part of the loaves sliding down the same. Both the rods, 17 and 18, are securely fixed by means of the screws 19 in corresponding holes provided in the square bar 20. The latter thus carries the baffle 6 and fits in corresponding recesses 21 of the reenforced parts 22 of the supports 12 in which it is rigidly held by means of the plate 23 screwed unto the parts 22 by the bolts 24. By unscrewing these bolts, the plate 23 and thereby the bar 20 with the whole baffle 6 can be quickly removed and the latter exchanged for one having different grooves suitable for loaves of a different size. In order to place the pan-nests onto the canting bar 5 always into their proper position in regard to the grooves in the plate 16 of the baffle 6, two guides 25 and 26 consisting of strong band iron and slightly curved outwards are preferably provided. The guide 25 is stationary and fixed to the canting bar 5 by the same screw 13 which fastens the latter to the support 12. The position of the guide 26 can be changed in order to conform with the different widths of the pan-nests employed; it is fastened to the canting bar 5 by means of the clamp 27, the hinged narrow part 28 of which is locked to the thicker back part 29 by means of the thumb screw 30. The angle iron 31, fixed to the top of the frame work 10, and the plate 32, carried by the supports 12 by means of the brackets 33, serve to prevent any pans from slipping over the edge of the conveyer 1, and the rod 34, stretching across the latter and resting in suitable openings provided in the upright of the angle iron 31 and in the plate 32, stops the pans from traveling beyond the working place underneath the canting bar 5 of the attendant.

I claim:

1. An apparatus for righting bread, comprising two superimposed planes inclined in opposite direction to each other, the upper plane containing channels corresponding in cross section to that of the top of the loaves to be righted, the distance in the horizontal between the lower edge of the upper plane and the upper part of the lower plane being such that a loaf, dropped top downward into one of the channels of the said upper plane and sliding down the same, passes easily between them, hitting the said lower plane with the edge of its bottom, whereby it is righted.

2. An apparatus for righting bread, comprising two superimposed planes inclined in opposite direction to each other, the upper plane containing channels corresponding in cross section to that of the top of the loaves to be righted, and the upper part of the lower plane being curved, the distance in the horizontal between the lower edge of the said upper plane and the curved part of the said lower plane being such that a loaf, dropped top downward into one of the channels of the said upper plane and sliding down the same, passes easily between them, hitting the curved part of the lower plane with the edge of its bottom, whereby it is righted.

3. An apparatus for righting bread, comprising an inclined plane containing channels corresponding in cross section to that of the top of the loaves to be righted, a plane situated below, inclined in opposite direction to and curved in its upper part concavely towards the said channelled upper plane, the distance between the lower edge of the latter and the curved part of the said lower plane being such that a loaf, dropped top downward into one of the channels of the said upper plane and sliding down the same, passes easily between them, hitting the curved part of the said lower plane with the edge of its bottom, whereby it is righted, and guides forming prolongations of the ridges between the channels of the said upper plane and following in outline the said lower plane at such a distance as to guide the righted loaf down the latter.

4. An apparatus for righting bread, comprising a straight bar on which the pans containing the loaves are canted over to separate the latter from the former, an inclined baffle arranged opposite to and at such a distance from the said bar that the separated loaves drop top downward onto the said baffle and sliding down the same, pass easily through between them, and an inclined chute pointing in opposite direction to the said baffle and arranged underneath the latter at such a distance and in such a manner, that the loaves coming from the said baffle hit the upper part of the said chute with the edge of their bottom, whereby they are righted.

5. An apparatus for righting bread, comprising a platform receiving the hot baked loaves in their pans, a straight bar arranged at a suitable distance above and alongside the said platform for canting over thereon the pans containing the loaves, a baffle placed opposite and parallel to the said bar and at such an inclination towards and such a distance from the latter that the loaves, tipped on the said bar out of their pans, drop top downward onto the said baffle and, sliding down the same, pass through the open space between the said baffle and the said bar, and an inclined chute pointing in opposite direction to the said baffle and arranged underneath the latter in such a manner and at such a distance therefrom that the loaves coming from the same strike the upper part of the said chute with the edge of their bottom and then slide down the latter, top upwards.

6. An apparatus for righting bread, comprising a straight bar on which the pans containing the loaves are canted over, an inclined baffle arranged opposite to and at such a distance from the said bar that the separated loaves drop top downward thereon and, sliding down, pass easily through the space between them, and an inclined chute fixed with its upper curved part to the said bar, pointing in opposite direction to the said baffle and arranged in regard to the latter and to the said bar in such a manner and at such a distance that the loaves coming from the said baffle hit the curved part of the said chute with the edge of their bottom and slide down the same duly righted.

7. An apparatus for righting bread, comprising a straight bar on which the pans containing the loaves are canted over, an inclined baffle provided with channels corresponding in cross section to that of the loaves to be righted and arranged opposite to and at such a distance from the said bar that the separated loaves drop top downward into the channels of the said baffle and, sliding down the same side by side, pass easily through between the lower end of the said baffle and the said bar, and an inclined chute pointing in opposite direction to the said baffle and arranged in regard to the latter and the said bar in such a manner and at such a distance therefrom that the loaves coming down from the said baffle strike the said chute with the edge of their bottom and slide down the same duly righted.

8. An apparatus for righting bread, comprising a straight bar on which the pans containing the loaves are canted over, an inclined baffle provided with channels corresponding in cross section to that of the loaves to be righted and arranged opposite to and at such a distance from the said bar that the separated loaves drop top downward onto the said baffle, guides mounted on the said bar to place the pans to be tipped always exactly opposite the channels of the said baffle, and an inclined chute pointing in opposite direction to the said baffle and so arranged underneath and at such a distance from the latter that the loaves coming down from the same hit the said chute with the edge of their bottom and slide down the latter duly righted.

9. An apparatus for righting bread, comprising a straight bar on which the pans containing the loaves are canted over, an inclined baffle provided with channels corresponding in cross section to that of the loaves to be righted and arranged opposite to and at such a distance from the said bar that the separated loaves drop top downward into the channels of the said baffle, and, sliding down the same side by side, pass easily through the space between the lower end of the said baffle and the said bar, an inclined chute pointing in opposite direction to the said baffle and arranged in regard to the latter and the said bar in such a manner and at such a distance therefrom, that the loaves coming down from the said baffle strike the said chute with the edge of their bottom, guides being prolongations of the ridges between the channels of the said baffle and following in outline the said chute at such a distance as to guide the righted loaves down the same side by side as they reached it, two supports each carrying one end of the said bar, of the said chute and of the said channelled baffle with the said guides, means to rigidly fix the said bar and the said chute to the said supports, and means to securely, but movably attach the said baffle with the said guides to the said supports.

10. In an apparatus for righting bread, in combination a stationary canting bar for separating thereon the loaves from their pans, an inclined baffle placed parallel and opposite to the said canting bar for the separated loaves top downward to drop on their tops, and a plurality of curved, parallel rods rigidly fixed to the said canting bar and so arranged underneath the said baffle as to form an inclined chute pointing opposite to the latter, so that the loaves sliding down from the said baffle hit the upper curved part of the said chute with the edge of their bottom.

11. In an apparatus for righting bread, in combination a canting bar for separating thereon the loaves from their pans, two supports each carrying one end of the said canting bar, a corrugated iron plate having grooves corresponding to the cross section of the upper part of the loaves to be righted, a stout square bar stretching between and attached to the two above named supports, rods fixed to this bar and carrying the said plate at such an inclination towards and such a distance from the said canting bar as to serve as baffle for the separated loaves top downward to drop on and then slide down the same through the open space between the latter and the former, and an inclined chute situated underneath and pointing opposite to the inclination of the said plate in such a manner that the loaves coming down from the latter hit the said chute with the edge of their bottom, the above named two supports having such a shape as to form the sidewalls for the said chute.

12. In an apparatus for righting bread, in combination a canting bar for separating thereon the loaves from their pans, two supports each carrying one end of the said canting bar, two guides, one rigidly fixed to and the second one movably clamped on the said canting bar for guiding the pans to be emptied, a baffle provided with channels corresponding in cross section to that of the upper part of the loaves to be righted and fixed to the above named supports at such an inclination towards and at such a distance from the said canting bar that the loaves separated on the latter drop top downward into the channels of the said baffle, and an inclined chute pointing in opposite direction to the said baffle and arranged in regard to the latter and the said canting bar in such a manner underneath and at such a distance from the same that the loaves, sliding down the channels of the said baffle and through the space between the latter and the said canting bar, hit the said chute with the edge of their bottom.

13. In an apparatus for righting bread, in combination, a canting bar for separating thereon the loaves from their pans, two supports each carrying one end of the said canting bar, an inclined baffle placed opposite to and at such an inclination towards and such a distance from the said canting bar that the loaves separated thereon drop top downward into the same, channels provided side by side in the said baffle and corresponding in cross section to the upper part of the loaves to be righted, an inclined chute curved in its upper part, pointing in opposite direction to the said baffle and arranged in such a manner and at such a distance from the same that the loaves sliding down the said channels of the said baffle through the space between the latter and the said canting bar hit the said chute with the edge of their bottom, a stout square bar stretching between the above named supports of and opposite to the said canting bar, recesses provided in the said supports for the ends of the said square bar to fit in, rods carrying the said baffle along the lowest parts of the said channels and fixed with their free ends in the said square bar, rods carrying the said baffle along the ridges in which the said channels meet, curved downwards following in outline the said curved chute at such a distance as to serve as guides for the upper parts of the loaves sliding down the same and fixed also in the said square bar, a plate fitting over the said recesses in which the said square bar is lodged, and means arranged at the said supports and the said plate for retaining the latter on the said recesses and thus locking the said square bar therein.

14. In an apparatus for righting bread, in combination with a conveyer bringing the pans containing the baked loaves from the oven, a canting bar arranged at a suitable distance above and alongside the said conveyer for separating thereon the loaves from their pans, two supports each carrying one end of the said canting bar, a rod placed across the said conveyer so as to prevent the pans containing the loaves from traveling beyond the working place underneath the said canting bar, means provided along each side of the said conveyer for preventing the pans from dropping over its edges, an inclined baffle provided with channels corresponding in cross section to that of the loaves to be righted and mounted on the above named supports at such an inclination towards and such a distance from the said canting bar that the loaves separated on the latter drop top downward into the channels of the said baffle, and inclined chute pointing in opposite direction to the latter, fixed with the ends of its curved upper part to the said canting bar and arranged in such a manner underneath and at such a distance from the said baffle that the loaves sliding down its channels through the space between the same and the canting bar, hit the said chute with the edge of their bottom, and a conveyer arranged underneath the said chute for carrying away the righted loaves sliding down the same.

GUSTAV BERNHARD EGGERT.